United States Patent

[11] 3,553,474

| [72] | Inventors | Roger L. Kramer<br>Madison, Wis.;<br>James Beyer, Salzgitter-Thiede, Germany |
|---|---|---|
| [21] | Appl. No. | 817,089 |
| [22] | Filed | Apr. 17, 1969 |
| [45] | Patented | Jan. 5, 1971 |
| [73] | Assignee | Oak Electro/Netics Corporation<br>Crystal Lake, Ill.<br>a corporation of Delaware |

[54] BALUN ISOLATOR
5 Claims, 2 Drawing Figs.

[52] U.S. Cl.......................................... 307/17,
333/11
[51] Int. Cl........................................ H02j 3/00
[50] Field of Search......................... 307/17, 11,
42, 43; 323/45, 43; 333/8, 11

[56] References Cited
UNITED STATES PATENTS

| 3,302,030 | 1/1967 | Deming.................... | 307/17 |
| 1,780,962 | 11/1930 | Bailey et al................ | 307/17ux |
| 2,909,733 | 10/1959 | Walter...................... | 333/11 |
| 3,109,998 | 11/1963 | Pelts III, et al............ | 333/11 |
| 3,143,715 | 8/1964 | Martens et al.............. | 333/8 |

*Primary Examiner*—Robert K. Schaefer
*Assistant Examiner*—H. J. Hohauser
*Attorney*—Parker, Carter & Markey ABSTRACT: An electrical circuit which can be arranged to provide both isolation and power splitting. Three transformers are interconnected with the secondary of a first transformer being connected to the center tap of the secondary of a second transformer and to one side of the secondary of a third transformer. The other side of the secondary of the third transformer is connected to one side of the secondary of the second transformer with the first side of the secondary of the third transformer being connected to the other side of the secondary of the second transformer. When used as a power splitter, there is a signal generator in the primary of the third transformer and loads in the primaries of the first and second transformers. When used as a power isolator, there are signal input means in the primaries of the first and second transformers and a load in the primary circuit of the third transformer.

PATENTED JAN 5 1971   3,553,474

INVENTORS.
ROGER L. KRAMER
JAMES BEYER
BY Parker, Carter & Markey
Attorneys.

BALUN ISOLATOR

SUMMARY OF THE INVENTION

This invention relates to an electrical circuit for use as an isolator and as a power splitter and has particular relation to a three transformer circuit for providing isolation between two inputs to a common load and to split the power from one input to two loads.

One purpose of the invention is a circuit of the type described which may be used with conventional Balun transformers.

Another purpose is a simply constructed reliably operable circuit which may be used either as a power splitter or as an isolator.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
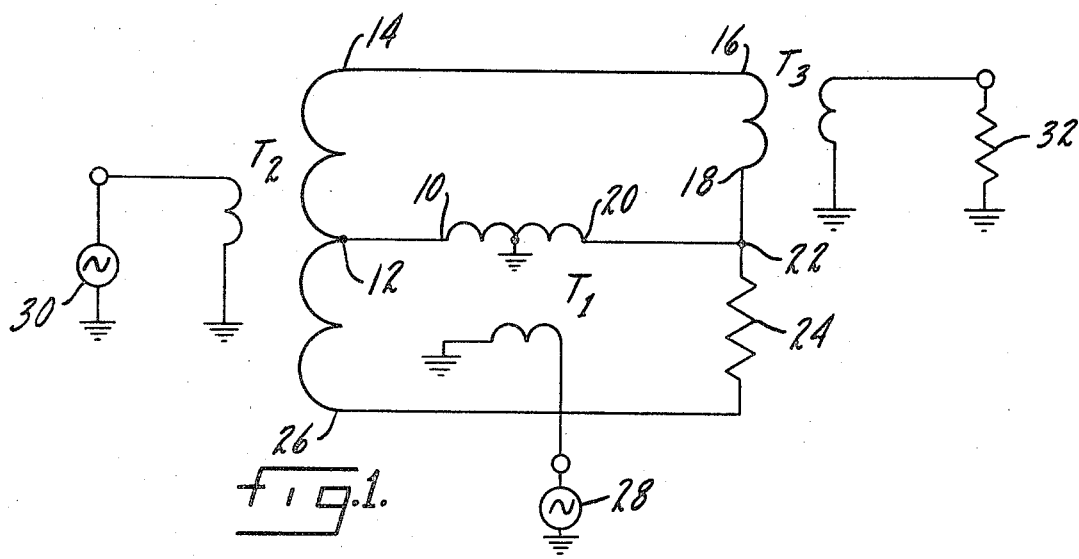
FIG. 1 is an electrical diagram of the circuit disclosed functioning as a power isolator.

In FIG. 1 there are three identical transformers designated $T_1$, $T_2$ and $T_3$. The side 10 of the secondary of $T_1$ is connected to the center tap 12 of the secondary of $T_2$. The top side 14 of the secondary of $T_2$ is connected to the top side 16 of the secondary of $T_3$. The bottom side 18 of $T_3$ is connected through junction point 22 to the right side 20 of the secondary of $T_1$. The junction point 22 is connected to a resistor 24 with the other side of the resistor 24 being connected to the bottom side 26 of the secondary of $T_2$.

In the configuration of FIG. 1 there is a signal input means or generator 28 connected in the primary circuit of $T_1$ and a similar signal generator 30 connected in the primary circuit of $T_2$. In the primary circuit $T_3$ there is a load resistor 32 which may diagrammatically represent any conventional type of load. The signal generators, as diagrammatically shown, will include impedance equal to the transformer load impedance.

The value of resistor 24 is important. It should be equal to $$\left(\frac{n_s}{n_p}\right)^2 R_L$$

where $n_s$ and $n_p$ are equal to the number of turns in the primary and secondary of any one of the identical transformers $T_1$, $T_2$ and $T_3$ and where $R_L$ is equal to the load resistance in any one of the primary circuits.

In the operation of the circuit of FIG. 1, the current generated in the secondary of $T_1$ due to the signal generator 28 splits equally at the center tap 12 of the secondary of $T_2$ so as to cancel any input to the primary of $T_2$ due to the current from the primary of $T_1$. The power associated with the current from $T_1$ may be approximately 50 percent dissipated in the resistor 24 with the other half of the current passing through the secondary of $T_3$ thus providing an input to the primary of $T_3$. The current in the secondary of $T_2$ caused by the signal generator 30 will in like manner be approximately equally split between resistor 24 and the secondary of $T_3$. Thus the power from $T_2$ will be approximately equally split between resistor 24 and $T_3$. As can be seen, there is no input to the primary of $T_2$ from $T_1$, nor is there any input to the primary of $T_1$ from the current generated in the primary of T 2. Thus there is isolation between transformers $T_1$ and $T_2$ while at the same time both provide an output in the primary of $T_3$ and thus to load 32.

The transformers $T_1$, $T_2$ and $T_3$ may be conventional Balun transformers, although obviously the invention should not be limited to this type of transformer.

Figure 2:
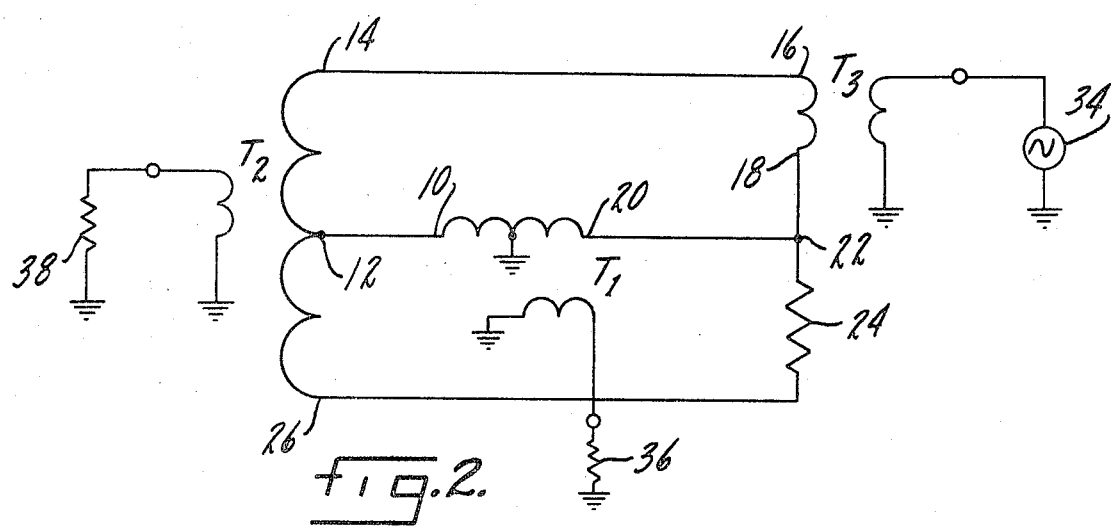
FIG. 2 is an electrical diagram illustrating the circuit disclosed functioning as a power splitter.

Turning to FIG. 2, the circuit arrangement as far as the secondaries of the transformers $T_1$, $T_2$ and $T_3$ is the same as illustrated in FIG. 1. However, the circuit is used as a power splitter and not as an isolation circuit. Thus, there is a signal generator 34 in the primary of $T_3$ and loads 36 and 38 in the primary circuits of transformers $T_1$ and $T_2$ respectively.

In operation, the current flowing in the primary of $T_3$ will cause a corresponding current in the secondary of $T_3$ which will flow down through the secondary, from 16 toward the point 18. At the junction 22 the current will split with approximately two-thirds of the current flowing through the secondary of $T_1$ and one-third flowing down to resistor 24 and then up through the bottom half of the secondary of $T_2$. At point 12 the two currents will join and the entire current then flows through the top half of the secondary of $T_2$. With this configuration, the power provided for the secondary of $T_1$ will be equal to the power provided to the secondary of $T_2$ and thus the power will be equally split from the input between the two outputs.

In the configuration of FIG. 2, when used as a power splitter, the circuit may find application when two television sets are connected to a single antenna. Each of the primaries of the transformers of $T_1$ and $T_2$ would receive approximately equal power from the primary of $T_3$ which could represent an antenna.

In the circuit of FIG. 1, there may be two antennas and their inputs are to be directed to a single receiver. Again, this could be a home television application. The invention also has use in VHF/UHF test equipment in which it is desired to isolate inputs and have them go to a common output, or to split a signal equally between two outputs.

Whereas the preferred form of the invention has been shown and described herein, it should be realized that there are many modifications, substitutions and alterations thereto within the scope of the following claims.

We claim:

1. An electrical circuit for performing isolation and power splitting functions, identical first, second and third transformers each having primary and secondary coils, the secondary of said first transformer being connected on one side to the center of the secondary of the second transformer and on the other side to one side of the secondary of the third transformer, one side of the secondary of the second transformer being connected to the other side of the secondary of the third transformer, and the other side of the secondary of the second transformer being connected to said one said of the secondary of the third transformer, signal input means connected to the primary of at least one of said transformers, with a load being connected to the primary of the remaining transformers.

2. The circuit of claim 1 further characterized by and including a resistor connected between the other side of the secondary of the second transformer and said one side of the secondary of the third transformer.

3. The circuit of claim 2 further characterized in that the value of said resistor is equal to $\left(\frac{n_s}{n_p}\right)^2 R_L$ where $n_s$ and $n_p$ are equal to the number of turns in the primary and secondary of any one of said transformers where $R_L$ is equal to the load in any one of the primary circuit.

4. The circuit of claim 1 arranged for isolation and further characterized in that said signal input means includes separate signal input means connected to the primary of the first and second transformers, said load being connected to the primary of the third transformer.

5. The circuit of claim 1 arranged for power splitting and further characterized in that said signal input means is connected to the primary of the third transformer, which said loads being connected to the primaries of the first and second transformers.